Figure 1:
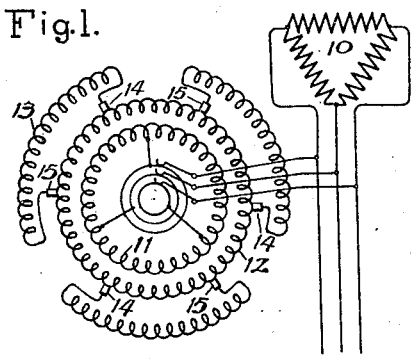

Nov. 8, 1927.

J. I. HULL 1,648,688

BRUSH SHIFTING ARRANGEMENT FOR DYNAMO ELECTRIC MACHINES

Filed Jan. 16, 1926

Inventor:
John I. Hull,
by
His Attorney.

Patented Nov. 8, 1927.

1,648,688

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

BRUSH-SHIFTING ARRANGEMENT FOR DYNAMO-ELECTRIC MACHINES.

Application filed January 16, 1926. Serial No. 81,781.

My invention relates to a brush shifting mechanism for commutator dynamo electric machines. There are certain types of alternating current commutator machines or combinations of machines which employ two sets of relatively movable brushes. One example of such a machine comprises a motor having a rotor primary winding and a stator secondary winding. A commutator is associated with the primary winding either directly or inductively and brushes bearing on the commutator are connected to opposite ends of the secondary phase windings. By such an arrangement the phase and magnitude of the voltage injected into the secondary winding may be varied by shifting the brushes so as to vary the power factor and speed of the motor.

If desired the commutator and brushes may be placed on an entirely separate frequency changer or the two sets of brushes may be placed on separate frequency changers having a double commutator. Where a separate commutator machine or machines are used they should be driven synchronously with the main induction machine and be supplied at the same frequency. With any of these arrangements the same relative displacement of the two sets of brushes, respectively connected to opposite ends of the secondary phases of the induction machine, produce similar regulating effects, and consequently a brush shifting arrangement which gives the proper relative displacement of the brushes may be used in all such cases. This will be evident when it is considered that the commutator of such a machine, due to its association with the rotary primary winding of the machine and the stationary brushes, is nothing more or less than a commutator type frequency changer which gives a frequency equal to that induced in the stationary secondary winding.

In a motor of this type it is known that when the brushes connected to the opposite ends of the secondary phase windings are on the same commutator segment no voltage is injected into the secondary and that the secondary phases are short circuited so that the motor will run at approximately synchronous speed as an ordinary induction motor. If the brushes are now separated a voltage will be injected into the secondary. If the spacing of the brushes is symmetrical with respect to secondary winding with which they are connected the voltage which is injected into the secondary will be such as to vary the speed of the motor either above or below synchronism, depending upon whether the injected voltage is in phase opposition or in phase with the induced secondary voltage. If the brushes are shifted in one direction from a common symmetrical position the speed will increase above synchronism and if in the other direction, the speed will decrease below synchronism and in this way the speed of the motor may be varied through a wide range above and below synchronism. It is also known that if the brush spacing is non-symmetrical with respect to the secondary winding with which the brushes are connected the injected voltage will have a component which influences the power factor of the motor and obviously that non-symmetrical spacing which improves the power factor of the motor is the one which is desired. It is known that the non-symmetrical spacing which improves the power factor for supersynchronous operation is in the opposite direction from that which improves the power factor for subsynchronous operation. Of course no power factor compensation can be obtained if and where the brushes pass each other on the commutator when going from above to below synchronism, or vice versa. Many attempts have been made to provide a brush shifting arrangement for regulating the speed of the motor through synchronism while maintaining power factor compensation. Some of these arrangements are extremely complicated while others give correct power factor compensation at only certain speeds. Of the latter class it has been proposed to provide a brush shifting arrangement for simultaneously moving the brushes in opposite directions at different angular velocities such that full power factor compensation is obtained at the maximum and minimum speeds but with which the power factor compensation is gradually reduced to zero at approximately synchronous speed where the brushes pass each other on the commutator. Thus with such an arrangement the central range of speed operation which is most used has the least power factor compensation and for this reason the arrangement is defective.

It is the object of my invention to provide a single brush shifting arrangement which will give better power factor correction at all intermediate speeds except within a very small range of operation close to synchronism.

In carrying my invention into effect I provide a brush shifting arrangement which produces displacement of the brushes in opposite directions either at the same, or nearly the same angular velocities, except at one or more points where the movement of one brush yoke is stopped while the other one is advanced any desired distance. Thus when shifting the brushes through a synchronous speed position, beneficial power factor correcting displacement may be retained right up to this position; then one brush is stopped while the other brush is carried past it until the power factor correcting displacement is again established after which both brushes are again moved in opposite directions for speed control.

Figure 2:
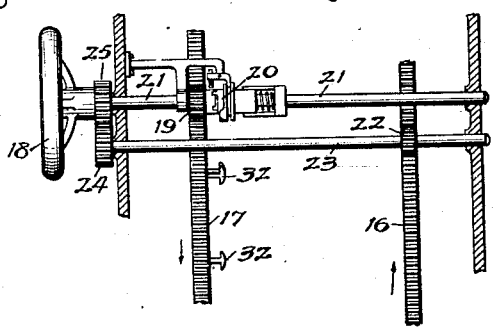
Figure 3:
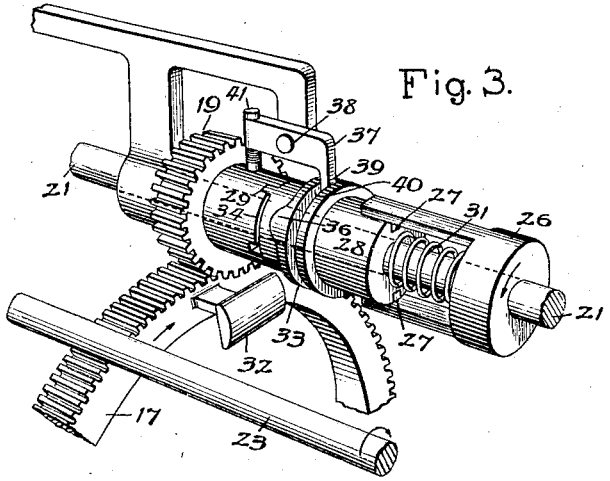
Figure 4:
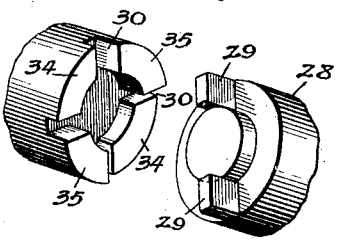
Figure 5:
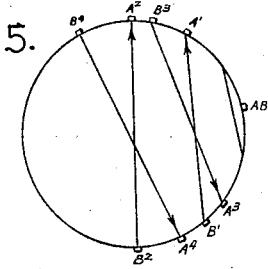
Figure 6:
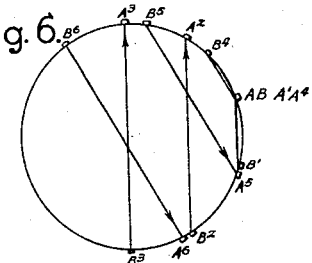
Figure 7:
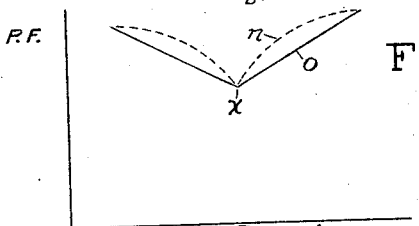

The features of my invention which are believed to be novel and patentable will be pointed out in the claims appended hereto. For a better understanding of my invention reference is made in the following description to the accompanying drawings in which Fig. 1 represents the electrical connections of a commutator machine to which my invention is applicable; Fig. 2 illustrates the manner in which the two brush yokes are geared to the brush shifting mechanism; Fig. 3 shows the details of one arrangement for stopping one brush yoke while the other is moved; Fig. 4 is an exploded view of a portion of the clutch mechanism of Fig. 3; Fig. 5 is a vector diagram illustrative of the manner of shifting brushes known to the prior art; Fig. 6 is a vector diagram illustrative of the manner of shifting the brushes according to my invention, and Fig. 7 is a curve comparing the power factor corrections obtainable by these two brush shifting arrangements.

Referring to Fig. 1, 10 represents a source of polyphase supply, 11 the primary rotor winding of a polyphase commutator motor supplied from 10 through suitable slip rings and brushes, 12 a regulating commutated winding inductively associated with the primary winding 11, 13 the stator secondary winding of the machine, and 14 and 15 the brushes bearing on the commutator of the commutated winding 12. In this type of machine the frequency supplied to the brushes is equal to the frequency induced in the secondary winding. The direction and magnitude of the voltage injected into the secondary winding through the brushes is determined by the relative positions of the brushes on the commutator. The power factor of the motor is influenced by the relative shift of the brushes 14 and 15 with respect to the stator. All of the brushes connected to corresponding ends of the stator phases, such as brushes 15, are supported from one brush yoke, such as 16 in Fig. 2, and are shifted together. The other set of brushes 14 are similarly supported from the other brush yoke, such as 17 in Fig. 2. By means of the gearing the two brushes are connected to a common drive shaft which may be operated by a hand wheel 18 by means of which all of the brushes may be shifted. Thus yoke 17 is connected through a gear wheel 19 and a clutch 20 to shaft 21 on which the hand wheel is mounted and yoke 16 is connected through gear 22, shaft 23, and gears 24 and 25 to the drive shaft 21. It is seen that by this arrangement the yokes will be shifted in opposite directions and that the relative angular velocities at which they are shifted will be determined by the gear ratios.

For the purpose of explaining my invention the gear ratios between the drive shaft 21 and the brush yokes will be considered to be equal but I do not wish to limit my invention in this respect because in certain cases it may be desirable to move the yokes in opposite directions at slightly different angular velocities. The purpose of clutch 20 is to interrupt the drive between yoke 17 and shaft 21 at one or more predetermined positions while the other yoke continues to move a predetermined amount to obtain a readjustment of the brushes as regards power factor correction.

Fig. 3 shows the details of the clutch mechanism in a driving position. This mechanism comprises a driving dog member 26 rigidly secured to the drive shaft and provided with teeth 27 fitting in slots in the sliding clutch member 28. This allows part 28 to slide back and forth on the shaft 21 while maintaining a driving connection between it and the shaft. The forward end of clutch member 28 carries teeth 29, Fig. 4, which are arranged to mesh with slots 30 in the hub of gear wheel 19 when the member 28 is moved to the position shown, thus establishing a driving connection between the shaft 21 and gear 19. A coiled spring 31 normally maintains the clutch member 28 in the driving relation shown. On the brush yoke 17 is provided one or more cam fingers 32 which, when moved under the clutch, come against a lobe 36 on the collar 33 of the slidable clutch member 28 and move this member to the right on shaft 2 until the teeth 29 disengage the slots 30 in the hub of gear wheel 19, thereby breaking the driving connection between shaft 21 and the brush yoke 17.

It is evident that this cam moving device should operate for both directions of movement of the yoke 17 and that provision should be made for the reengagement of the clutch after the other brush yoke 16 has been advanced the desired extent. Also it should be arranged so that if, when the clutch having been disengaged by a movement of the yoke 17 in one direction, and it is desirable to reverse the movement of the brush yoke, the driving connection for such opposite motion will not be broken. When the driving connection is broken the yoke 17 remains stationary with the cam finger 32 against the lobe 36 so that the fingers 29 cannot slide back into any of the deep slots 30 until shaft 21 has been rotated the desired extent to disengage lobe 36 from cam finger 32. To provide for these requirements the clutch surface of the hub of gear 19 between alternate adjacent slots is cut down to about one-half the depth of the slots 30. Thus in Fig. 4, it is seen that the surfaces 34 are cut back to about one-half the depth of slots 30 from the other surfaces 35. The cam finger 32 and the lobe 36 on collar 33 are arranged to move member 28 to the right in the disengaging operation only far enough for the teeth 29 to clear the lower surfaces 34 but not the higher surfaces 35. It will thus be seen that when shaft 21 is being turned in a counter-clockwise direction, as viewed in Fig. 3, cam finger 32 will move in a clockwise direction under collar 33 and when lobe 36 comes opposite 32 member 28 will be moved to the right until teeth 29 disengage the deep slots 30. Then said teeth will rotate in a counter-clockwise direction over the low surfaces 34 without driving the gear wheel 19 until they come against the higher surfaces 35 at the next succeeding set of deep slots. During this time the other shaft 23 has been driven to advance the other brush yoke 16 and lobe 36 has moved past cam finger 32. When the teeth 29 come against the higher surfaces 35 the driving connection is again established for that direction of rotation of the parts and spring 31 will again move clutch member 28 to the left so that its teeth 29 will move into the deep portion of the slots 30 with which they are alined. It is evident that this functioning of the mechanism is operative for either direction of movement of the brush yokes and that the other requirements of the mechanism mentioned above are provided for the reverse functioning occurring at a slightly different position of 17. The distance brush yoke 16 will move while the other brush yoke is stationary may be altered by changing the gear ratio between the brush yokes and the gear wheels which drive them.

It will be apparent that the functioning of the clutch mechanism will occur at the substantially same relative position or positions of the brushes irrespective of the direction in which they are moved. Thus if the finger 32 is positioned to disengage the clutch at a synchronous speed relation of the brushes, it will perform its function at this speed relation of the brushes irrespective of whether the speed of the motor is being raised or lowered. One such disengaging operation at synchronous speed will generally be sufficient, but as many such operations as is desired may be had by providing additional cam fingers on yoke 17, as shown for example in Fig. 2, and the sequence of several such operations may be properly provided for by the positions of such cam fingers on yoke 17.

Where the motor is provided with many brushes and there is a large brush area on the commutator, the brush friction may be sufficient to have a tendency to move the brush yoke 17 along in the direction of rotation of the commutator when its driving connection is disengaged by the clutch. Where necessary, this may be guarded against by providing a lock for the brush yoke operated by the clutch mechanism so that this brush yoke will be held stationary when the clutch is disengaged. One such locking means is represented at 37 consisting of a member pivoted at 38 and having a downward extending part 39 normally falling into a groove 40 in collar 33. A pin 41 in the other end comes opposite the hub of wheel 29. When collar 33 is moved to the right to disengage the clutch, part 39 of the locking member will be forced up out of the groove and pin 40 will be forced down against the hub of wheel 19. Preferably a hole not shown will be provided in the hub for pin 41 to move into when in the locking positions. The engaging movement of the clutch will allow 39 to drop back in groove 40 again, thereby unlocking wheel 19.

In Figs. 5 and 6 the circles may be considered as representing 360 electrical degrees of commutator surface. In Fig. 5, which represents the vector relations of the voltages injected into the winding 13 when the motor is provided with a brush shifting arrangement of the prior art wherein the brushes are shifted at different angular velocities, A B represents the positions of the two brushes connected to the opposite ends of a secondary phase at substantially synchronous speed when the two brushes rest upon the same commutator bar and the secondary winding is short circuited therethrough. A represents the brush supported by the slow moving yoke and B represents the brush supported by the faster moving yoke. The brushes may be shifted through positions $A^1 B^1$ to $A^2 B^2$ to raise the speed and through position $A^3 B^3$ to position $A^4 B^4$ to lower the speed. If $A^2 B^2$ and $A^4 B^4$ represent the best power factor positions for maximum and minimum speeds, it will be evident that the power factor correction gradually reduces to zero at substantially synchronous speed. The power factor plotted against speed for a given load is shown in full lines in Fig. 7 where point X represents the synchronous speed relation of the brushes with no power factor correction.

Fig. 6 represents the vector relations of the voltages injected into the secondary with my brush shifting arrangement where the mechanism is arranged to hold one brush stationary while the other brush is shifted past it at or near synchronous speed. A B represents the synchronous speed position of the brushes. Brush A is the brush which is held stationary while brush B may be shifted to $B^1$ or to $B^4$ to raise or lower the speed. Thus the novel manner of shifting the brushes while passing through synchronism is at once to establish brush positions so that a power factor correcting voltage is injected into the secondary. If the brushes are thereafter shifted at the same rates we arrive at the maximum or minimum speed positions $A^3$ $B^3$ or $A^6$ $B^6$ with the same power factor compensation as in Fig. 5 for corresponding speeds. But it will be noticed that at all intermediate speeds except at synchronism a better power factor compensation is obtained with the arrangement of Fig. 6. The approximate improvement in power factor to be expected by my invention over that of the prior art is represented in Fig. 7, where power factor is plotted against speed. Point X represents the power factor for both arrangements at synchronous speed where there is no compensation. The full lines O represent the power factor with the old method of shifting the brushes and N the power factor with the new method.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is,—

1. A brush shifting arrangement for dynamo electric machines comprising two brush yokes, a reversible operating member for shifting said yokes through their operating ranges, driving mechanisms between said yokes and said operating member arranged to simultaneously move said yokes in opposite directions, and means for rendering one of said driving mechanisms inoperative while the other is operative over certain parts of the operating range.

2. A brush shifting arrangement for dynamo electric machines comprising two brush yokes, a reversible operating member normally in driving connection with both brush yokes for simultaneously shifting said yokes in opposite directions through their operating ranges, means for interrupting the driving connection between one of said brush yokes and the operating member while the other brush yoke is being shifted a predetermined amount at an intermediate point in the operating range, and means for reestablishing said driving connection again after said point has been past.

3. A brush shifting arrangement for dynamo electric machines comprising two brush yokes, an operating member for shifting said brush yokes, driving connections between said operating member and yokes arranged to cause movement of said yokes in opposite directions at approximately the same angular velocities, and automatic means for rendering the driving connection between one of said yokes and said operating member inactive while the other yoke is being shifted a predetermined amount.

4. In an alternating current motor, a primary rotor member provided with a winding and a commutator therefor, two adjustable brush sets bearing on said commutator, a secondary stator winding connected to both sets of brushes, and operating means for simultaneously moving said brush sets in opposite directions over the greater parts of their operating ranges and for moving only one brush set over the remaining part of the operating range.

5. A brush shifting device for dynamo electric machines comprising a pair of adjustable brush yokes, an operating member for said yokes, driving connections between each yoke and said operating member whereby said yokes may be simultaneously shifted in opposite directions, means for disengaging the driving connections to one of said yokes, means for locking said yoke against movement while disengaged, said two means being automatically operated in response to the movement of said operating member to stop the movement of one brush yoke while the other is being moved through a predetermined part of its range of movement.

6. A brush shifting arrangement for dynamo electric machines comprising a pair of brush yokes, an operating shaft, driving connections between said operating shaft and brush yokes whereby said yokes may be simultaneously shifted in opposite directions, a clutch for disengaging the driving connection to one of said yokes, and means dependent on the position of said yokes and responsive to the movement of said operating member for disengaging said clutch and responsive to a further movement of said operating member in the same direction for reengaging said clutch.

7. An alternating current motor having a primary rotor member provided with a winding and a commutator therefor, a stationary secondary winding, two sets of adjustable brushes on the commutator connected to the secondary winding for the purpose of regulating the speed and power factor of said motor and a brush shifting arrangement for said motor having means for simultaneously shifting said brushes in opposite directions for regulating the speed of said motor while maintaining a substantially fixed non-symmetrical displacement of said brushes with respect to the secondary winding with which they are connected and having other means for shifting such displacement of said brushes primarily for the purpose of power factor control.

8. An alternating current motor having a primary member provided with a winding and a commutator therefor, a secondary winding relatively rotatable with respect to the primary member, two sets of adjustable brushes on the commutator connected to said secondary winding for the purpose of regulating the speed and power factor of said motor, and a brush shifting arrangement for said motor having means for simultaneously shifting said brushes in opposite directions for regulating the speed of said motor above or below synchronism while maintaining said brushes in substantially a fixed non-symmetrical displacement with respect to the secondary winding with which they are connected, and other means for reversing the direction of such non-symmetrical displacement with respect to the secondary winding at approximately a synchronous speed position of said brushes.

In witness whereof. I have hereunto set by hand this 14th day of January, 1926.

JOHN I. HULL.